US012580173B2

(12) United States Patent
Wu et al.

(10) Patent No.: US 12,580,173 B2
(45) Date of Patent: Mar. 17, 2026

(54) ELECTRODE PLATE ROLLING APPARATUS AND ELECTRODE PLATE ROLLING METHOD

(71) Applicant: CONTEMPORARY AMPEREX TECHNOLOGY (HONG KONG) LIMITED, Hong Kong (CN)

(72) Inventors: Zhiyang Wu, Ningde (CN); Wang Zhang, Ningde (CN); Shisong Li, Ningde (CN); Chao Guo, Ningde (CN); Chao Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 89 days.

(21) Appl. No.: 18/234,386

(22) Filed: Aug. 16, 2023

(65) Prior Publication Data

US 2023/0411587 A1 Dec. 21, 2023

Related U.S. Application Data

(63) Continuation of application No. 17/137,047, filed on Dec. 29, 2020, now Pat. No. 11,777,072, which is a
(Continued)

(30) Foreign Application Priority Data

Nov. 9, 2018 (CN) .......................... 201821846114.8

(51) Int. Cl.
*H01M 4/04* (2006.01)
*B05C 11/02* (2006.01)

(52) U.S. Cl.
CPC ......... *H01M 4/0435* (2013.01); *B05C 11/025* (2013.01)

(58) Field of Classification Search
CPC .................................................. H01M 4/0435
See application file for complete search history.

(56) References Cited

U.S. PATENT DOCUMENTS 5,616,366 A 4/1997 Olsen et al.
2005/0236732 A1 10/2005 Brosch et al.
(Continued)

FOREIGN PATENT DOCUMENTS

CN 201556665 U 8/2010
CN 103210527 A 7/2013
(Continued)

OTHER PUBLICATIONS

Contemporary Amperex Technology Co., Limited, Extended European Search Report, EP19881943.5, Jul. 13, 2021, 4 pages.
(Continued)

*Primary Examiner* — Kelly M Gambetta
(74) *Attorney, Agent, or Firm* — XSENSUS LLP

(57) ABSTRACT

This application discloses an electrode plate rolling apparatus and an electrode plate rolling method that are configured to roll an electrode plate. The electrode plate includes a coated region and an uncoated region. The electrode plate rolling apparatus includes a roller group, a heating part, and a cooling part. The heating part is configured to heat the electrode plate, and the cooling part is configured to cool the electrode plate. The heating part further includes an extension assembly, and the extension assembly can extend the uncoated region when the heating part heats the electrode plate. The electrode plate passes through the cooling part after passing through the heating part. The heating part and the cooling part are configured to reduce a difference between an extensibility parameter of the uncoated region and an extensibility parameter of the coated region.

15 Claims, 2 Drawing Sheets

Related U.S. Application Data continuation of application No. PCT/CN2019/114757, filed on Oct. 31, 2019.

(56) References Cited

U.S. PATENT DOCUMENTS

| | | | | |
|---|---|---|---|---|
| 2010/0264133 A1* | 10/2010 | Jeong | .................... | H05B 6/104 |
| | | | | 219/653 |
| 2011/0143019 A1* | 6/2011 | Mosso | .................... | C23C 16/56 |
| | | | | 427/209 |
| 2011/0151350 A1* | 6/2011 | Iverson | .............. | H01M 8/2418 |
| | | | | 429/479 |
| 2011/0290180 A1* | 12/2011 | Leitner | .................... | D06B 3/10 |
| | | | | 118/69 |
| 2015/0129107 A1* | 5/2015 | Miyazaki | ............ | B32B 38/1841 |
| | | | | 156/522 |
| 2018/0274051 A1* | 9/2018 | Graff | ...................... | B21D 37/16 |
| 2019/0267598 A1* | 8/2019 | Xu | ...................... | H01M 50/403 |

FOREIGN PATENT DOCUMENTS

| | | | |
|---|---|---|---|
| CN | 203437408 | U | 2/2014 |
| CN | 105226238 | A | 1/2016 |
| CN | 107863491 | A | 3/2018 |
| CN | 107953565 | A | 4/2018 |
| CN | 108099052 | A | 6/2018 |
| CN | 108199005 | A | 6/2018 |
| CN | 208797098 | U | 4/2019 |
| JP | 5756556 | B1 | 7/2015 |

OTHER PUBLICATIONS

Contemporary Amperex Technology Co., Limited, International Search Report and Written Opinion, PCT/CN2019/114757, Jan. 9, 2020, 14 pgs.

Non-Final Office Action mailed on Jan. 18, 2022, received for U.S. Appl. No. 17/137,047, filed Dec. 29, 2020, 9 pages.

Final Office Action mailed on Jul. 27, 2022, received for U.S. Appl. No. 17/137,047, filed Dec. 29, 2020, 9 pages.

* cited by examiner

ELECTRODE PLATE ROLLING APPARATUS AND ELECTRODE PLATE ROLLING METHOD

CROSS-REFERENCE TO RELATED APPLICATIONS

This application is a continuation application of U.S. patent application Ser. No. 17/137,047, filed on Dec. 29, 2020, which is a continuation application of PCT Patent Application No. PCT/CN2019/114757, entitled "ELECTRODE SHEET ROLLING DEVICE, AND ELECTRODE SHEET ROLLING METHOD" filed on Oct. 31, 2019, which claims priority to Chinese Patent Application No. 201821846114.8, filed with the State Intellectual Property Office of the People's Republic of China on Nov. 9, 2018, and entitled "ELECTRODE PLATE ROLLING APPARATUS", each of which are incorporated herein by reference in their entireties.

TECHNICAL FIELD

This application relates to the technical field of energy storage device processing, and in particular, to an electrode plate rolling apparatus and an electrode plate rolling method.

BACKGROUND

Currently, a process of manufacturing a cathode electrode plate and an anode electrode plate of a lithium-ion battery includes steps such as stirring, coating, rolling, slitting, and tab region formation to produce electrode plates that meet assembly requirements. An objective of the rolling is to make an active substance bond more tightly with a substrate, make the active substance more homogeneous in thickness, and thus enhance a compacted density of the electrode plate to increase an energy density of the battery. A structure of a lithium battery rolling machine generally includes several parts such as a rewind-unwind system, a misalignment correction system, a rolling system, and a thickness measurement system.

Currently, a composite substrate (a plastic layer plated with a metal layer) is used instead of a copper foil (or aluminum foil) substrate, and an active substance is applied at preset position of the composite substrate to form a coated region and an uncoated region. During the rolling process, the uncoated region needs to be heated and extended. However, the plastic layer in the uncoated region may rebound after being heated, thereby leading to electrode plate wrinkles. In a case that the wrinkles are severe, rewinding of the electrode plate is disrupted.

SUMMARY

Considering the foregoing, an embodiment of this application provides an electrode plate rolling apparatus and an electrode plate rolling method to solve a problem of electrode plate wrinkles caused by rebound in an uncoated region during heating and extending in the prior art.

An embodiment of this application discloses an electrode plate rolling apparatus that is configured to roll an electrode plate. The electrode plate includes a coated region and an uncoated region. The electrode plate rolling apparatus includes a roller group, a heating part, and a cooling part. The heating part is configured to heat the electrode plate, and the cooling part is configured to cool the electrode plate.

The heating part further includes an extension assembly, and the extension assembly can extend the uncoated region when the heating part heats the electrode plate.

The electrode plate passes through the cooling part after passing through the heating part.

The heating part and the cooling part are configured to reduce a difference between an extensibility parameter of the uncoated region and an extensibility parameter of the coated region.

Exemplarily, the heating part snugly adjoins the cooling part.

Exemplarily, the heating part includes multiple first heating units distributed alternately along a width direction of the electrode plate, and each first heating unit is configured to directly heat a corresponding uncoated region.

The cooling part includes multiple first cooling units distributed alternately along a width direction of the electrode plate, and the first cooling unit is configured to directly cool a corresponding uncoated region.

Exemplarily, the heating part further includes second heating units distributed alternately along the width direction of the electrode plate, and each second heating unit is configured to directly heat a corresponding coated region.

The cooling part further includes second cooling units distributed alternately along the width direction of the electrode plate, and each second cooling unit is configured to directly cool a corresponding coated region.

Exemplarily, the first heating unit heats the uncoated region to a first preset temperature, and the second heating unit heats the coated region to a second preset temperature.

The first preset temperature is higher than the second preset temperature.

The first preset temperature is between a room temperature and 350° C., and the second preset temperature is between the room temperature and 350° C.

Exemplarily, the heating part is an integrated structure.

The cooling part is an integrated structure.

Exemplarily, the heating part includes at least one of a magnetic induction heating part, a hot air heating part, a radiant heating part, an infrared heating part, or a microwave heating part.

Exemplarily, the cooling part includes at least one of an air cooling part, an air cooling chamber part, or a liquid cooling part.

Exemplarily, an idler is disposed between the heating part and the roller group, and the electrode plate is wound on the idler so that the electrode plate is in a position that adapts to the heating part.

Exemplarily, the extension assembly includes an extension roller disposed downstream of the cooling part, and a tension monitoring part. A control part of the electrode plate rolling apparatus is able to control a rotation speed of the extension roller according to a monitoring result of the tension monitoring part.

An embodiment of this application discloses an electrode plate rolling method, including:

passing an electrode plate through a roller group;

passing the electrode plate through a heating part so that the electrode plate is heated;

passing the electrode plate through a cooling part so that the electrode plate is cooled; and extending an uncoated region of the electrode plate using an extension assembly when the heating part heats the electrode plate.

Exemplarily, the step of passing the electrode plate through a heating part so that the electrode plate is heated includes:

passing the electrode plate through multiple first heating units and second heating units so that the electrode plate is heated, where the first heating units alternate with the second heating units along a width direction of the electrode plate; and each first heating unit is configured to directly heat a corresponding uncoated region, and each second heating unit is configured to heat a corresponding coated region.

Exemplarily, the step of passing the electrode plate through a cooling part so that the electrode plate is cooled includes:

passing the electrode plate through multiple first cooling units and second cooling units so that the electrode plate is cooled, where the first cooling units alternate with the second cooling units along a width direction of the electrode plate; and each first cooling unit is configured to directly cool a corresponding uncoated region, and each second cooling unit is configured to cool a corresponding coated region.

The technical solutions disclosed in this application achieve the following beneficial effects:

In this application, during the rolling process, due to a difference in thickness, an extensibility parameter (such as an extension length) in the coated region is greater than an extensibility parameter in the uncoated region. When the heating part heats the electrode plate and extends the uncoated region at the same time, the extensibility parameter of the uncoated region increases due to a temperature rise, thereby reducing a discrepancy in the extensibility parameter between the coated region and the uncoated region. In addition, when the electrode plate passes through the cooling part after passing through the heating part, the temperature decreases, and the extended uncoated region has a lower rebound resilience and maintains an extended state, thereby reducing the difference in the extensibility parameter between the coated region and the uncoated region caused by the rebound of the uncoated region, reducing risks of wrinkling of the electrode plate during the extending, improving performance of the electrode plate, and preventing the electrode plate from being unable to rewind due to wrinkles.

REFERENCE NUMERALS

Figure 1:
FIG. 1 is a schematic diagram of an electrode plate rolling apparatus according to a specific embodiment of this application.

1: Calender roller group
11: Upper roll roller;
12: Lower roll roller;
2: Heating part;
21: First Extension Assembly;
3: Cooling part;
4: First idler;
5: Second idler;
6: Third idler;
7. Electrode plate;
71: Coated region;
72: Uncoated region;
8: Second Extension Assembly;

91: Second heating unit:
92: First heating unit:
101: Second cooling unit:
102: First cooling unit.

The drawings described here are incorporated into the specification as a part of the specification. The drawings illustrate embodiments of this application and are used together with the specification to explain the principles of this application.

DESCRIPTION OF EMBODIMENTS

The following describes this application in further detail with reference to specific embodiments and accompanying drawings.

In the description of this application, unless otherwise expressly specified, the terms "first" and "second" are for ease of description only, but shall not indicate or imply any priority; unless otherwise expressly specified, the term "a plurality of" or "multiple" means two or more; the terms such as "connected" and "fixed" or a variation thereof shall be understood in a broad sense. For example, a "connection" may be a fixed connection, or a detachable connection, or an integrated connection, or an electrical connection; or may be a direct connection or an indirect connection implemented through an intermediate medium. The term "battery" shall also be understood in a broad sense, and may be a battery cell, a battery assembly, a battery module, or a battery pack. A person of ordinary skill in the art can understand the specific meanings of the terms in this application according to the context.

Understandably, in the context of this application, the words of direction such as "on", "above", "under", "below", "left", and "right" described in the embodiments of this application are described from a perspective shown in the drawings, and shall not be understood as a limitation on the embodiments of this application. In addition, understandably, depending on the context, one element mentioned as being connected "on" or "under" another element not only means that the element may be directly connected "on" or "under" the other element, but also means that the element may be indirectly connected "on" or "under" the other element through an intermediate element.

Figure 2:
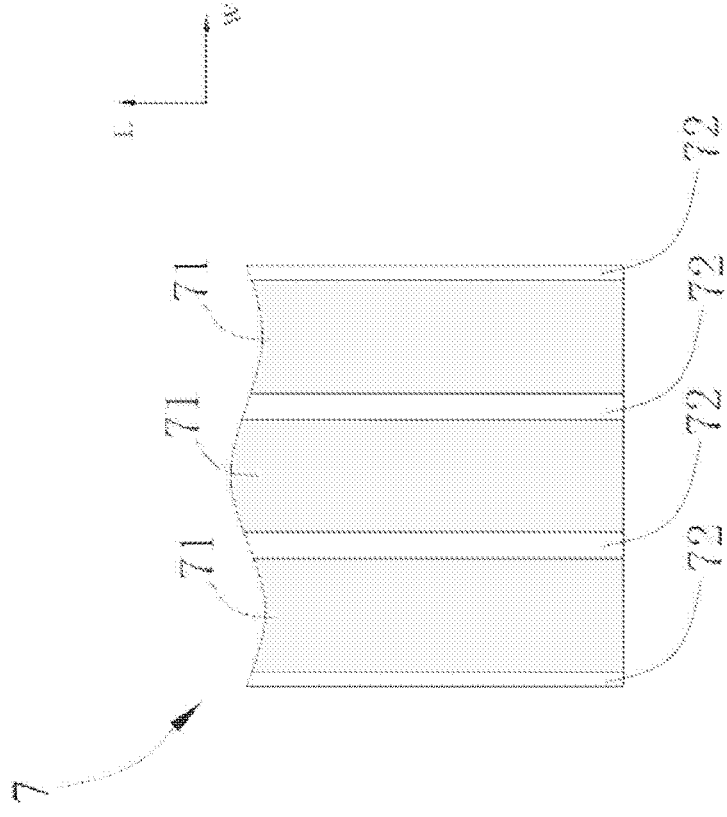
FIG. 2 is a schematic diagram of an electrode plate shown in FIG. 1.

To improve production efficiency in a production process of a lithium battery electrode plate, the electrode plate is coated in zebra stripes. That is, an active substance is applied alternately along a width direction of a substrate of the electrode plate 7 (as shown in FIG. 2), so that the electrode plate 7 has coated regions 71 alternating with uncoated regions 72 in the width direction W. In addition, when a composite substrate is used instead of a metal substrate, each uncoated region 72 of the electrode plate 7 is a plastic layer plated with a metal layer.

A thickness of a coated region 71 is greater than a thickness of an uncoated region 72. Therefore, during a rolling process, the coated region 71 is rolled first, and the coated region 71 is extended (that is, the coated region 71 is extended during the rolling process), but the uncoated region 72 does not extend (a length of the uncoated region 72 is basically unchanged during the rolling process), thereby resulting in an extensibility difference between the two (the extensibility difference means a discrepancy in a deformation size or deformation extent between the coated region 71 and the uncoated region 72). To reduce the extensibility difference between the coated region 71 and the uncoated region 72 during the rolling process, the uncoated region 72 may be extended during the rolling. To increase extensibility of the uncoated region 72 during the extending (to increase an extension size of the uncoated region 72 during the extending), the uncoated region 72 may be heated during the extending, so as to achieve good extensibility, and further reduce the extensibility difference between the coated region 71 and the uncoated region 72 during the rolling process, that is, reduce the discrepancy in the extension size between the two during the rolling process.

However, the uncoated region 72 is a plastic layer plated with a metal layer. Therefore, the plastic layer is likely to rebound after being heated and extended, thereby reducing the extension size of the extended uncoated region 72, increasing an extensibility discrepancy between the uncoated region 72 and the coated region 71, and leading to wrinkles of the electrode plate.

This application mainly solves the above technical problem by reducing the difference in an extensibility parameter between the coated region 71 and the uncoated region 72 of the electrode plate 7 during extending.

Referring to FIG. 1 and FIG. 2, FIG. 1 is a schematic diagram of an electrode plate rolling apparatus according to a specific embodiment of this application; and FIG. 2 is a schematic diagram of an electrode plate shown in FIG. 1.

A direction indicated by an arrow in FIG. 1 is a movement direction of the electrode plate 7 in the electrode plate rolling apparatus. A direction that is the same as the movement direction of the electrode plate 7 is a downstream direction, and a direction that is opposite to the movement direction of the electrode plate 7 is an upstream direction. In addition, an up-down direction shown in FIG. 2 denotes a length direction (L) of the electrode plate 7, that is, the movement direction of the electrode plate 7 in FIG. 1; and a left-right direction denotes a width direction (W) of the electrode plate 7.

In a specific embodiment, this application discloses an electrode plate rolling apparatus. The electrode plate rolling apparatus is configured to process an electrode plate 7 of a lithium battery. After undergoing a coating process, the electrode plate 7 includes coated regions 71 and uncoated regions 72 distributed alternately along a width direction. As shown in FIG. 1, the electrode plate rolling apparatus includes a roller group 1. The roller group 1 includes an upper roll roller 11 and a lower roll roller 12 that fit each other. During the processing, the rollers can roll the electrode plate 7 that passes through them.

In addition, as shown in FIG. 1, the electrode plate rolling apparatus further includes a heating part 2 and a cooling part 3. The heating part 2 is configured to heat the electrode plate 7, and the cooling part 3 is configured to cool the electrode plate 7. In the electrode plate rolling apparatus, the electrode plate 7 enters the cooling part 3 for cooling after being heated by the heating part 2. The heating part 2 further includes a first extension assembly 21, and the first extension assembly 21 can extend the uncoated region 72 to a preset size when the heating part 2 heats the electrode plate 7. The heating part 2 and the cooling part 3 are configured to reduce a difference between the extensibility parameter of the uncoated region 72 and an extensibility parameter of the coated region 71, that is, to reduce a difference between an extension size of the uncoated region 72 and an extension size of the coated region 71 during a rolling process.

In this application, during the rolling process, due to a difference in thickness, the extensibility parameter (such as an extension length) in the coated region 71 is greater than the extensibility parameter in the uncoated region 72. When the heating part heats the electrode plate and extends the uncoated region 72 at the same time, the extensibility parameter of the uncoated region 72 increases due to a temperature rise, thereby reducing a discrepancy in the extensibility parameter between the coated region 71 and the uncoated region 72. In addition, when the electrode plate passes through the cooling part after passing through the heating part, the temperature decreases, and the extended uncoated region 72 has a lower rebound resilience and maintains an extended state, thereby reducing the difference in the extensibility parameter between the coated region 71 and the uncoated region 72 caused by the rebound of the uncoated region 72, reducing risks of wrinkling of the electrode plate 7 during the extending, improving performance of the electrode plate 7, and preventing the electrode plate 7 from being unable to rewind due to wrinkles.

In addition, in this embodiment, after the heating part 2 and the cooling part 3 are disposed, due to rise of the temperature of the electrode plate 7 between the two, an elastic modulus of the uncoated region 72 in this section decreases. Under a pulling force of the first extension assembly 21, the uncoated region 72 in this section is plastically deformed while uncoated regions 72 in other positions can deform only elastically or deform to a smaller extent under the same pulling force. When passing through the cooling part 3, the uncoated region 72 that plastically deforms to a greater extent has the elastic modulus that becomes greater, and can deform only elastically or deform to a smaller extent. Therefore, the uncoated region 72 in this section between the heating part 2 and the cooling part 3 can generate significant tensile deformation. That is, the configuration of the heating part 2 and the cooling part 3 not only mitigates risks of wrinkling of the electrode plate 7, but also helps to form the electrode plate 7 by extending.

Specifically, in a first specific embodiment, during a movement process of the electrode plate 7, as shown in FIG. 2, the heating part 2 is configured to heat the uncoated regions 72. That is, in the uncoated regions 72 and the coated regions 71 that are distributed alternately along the width direction, only the temperature of the uncoated regions 72 increases, and the temperature of the coated regions 71 remains unchanged (the unchanged temperature of the coated regions 71 means that the heating part 2 does not directly heat the coated regions 71, but the temperature of the coated regions 71 also increases to some extent due to heat conduction between the coated regions 71 and the uncoated regions 72). Therefore, the heating part 2 includes multiple first heating units 92 distributed alternately along the width direction of the electrode plate 7 (for example, in the width direction shown in FIG. 2). Each first heating unit 92 is disposed corresponding to each uncoated region 72 to directly heat each uncoated region 72 conveniently.

Similarly, in this embodiment, the cooling part 3 is configured to cool the uncoated regions 72. That is, in the uncoated regions 72 and the coated regions 71 that are distributed alternately along the width direction, only the temperature of the uncoated regions 72 decreases, and the temperature of the coated regions 71 does not decrease (the cooling part 3 does not directly cool the coated regions 71, but the temperature of the coated regions 71 also decreases to some extent due to heat conduction between the coated regions 71 and the uncoated regions 72). Therefore, the cooling part 3 includes multiple first cooling units 102 distributed alternately along the width direction of the electrode plate 7 (for example, in the width direction shown in FIG. 2). Each first cooling unit 102 is disposed corresponding to each uncoated region 72 to directly cool each uncoated region 72 conveniently.

Further, the heating part 2 may be used to heat the uncoated regions 72 and the coated regions 71. The cooling part 3 may be configured to cool the uncoated regions 72 and the coated regions 71. Specifically, the heating part 2 further includes several second heating units 91 distributed alternately along the width direction of the electrode plate 7. Each second heating unit 91 is disposed corresponding to each coated region 71 to directly heat the coated regions 71 conveniently. Therefore, in this embodiment, the heating part 2 includes a first heating unit 92 and a second heating unit 91 that are distributed alternately along the width direction of the electrode plate 7.

In addition, the cooling part 3 further includes several second cooling units 101 distributed alternately. Each second cooling unit 101 is disposed corresponding to each coated region 71 to directly cool the coated regions 71 conveniently. Therefore, in this embodiment, the cooling part 3 includes a first cooling unit 102 and a second cooling unit 101 that are distributed alternately along the width direction of the electrode plate 7.

Specifically, in this embodiment, the first heating unit 92 heats the uncoated regions 72 to a first preset temperature, and the second heating unit 91 heats the coated regions 71 to a second preset temperature, where the first preset temperature is higher than the second preset temperature. The first preset temperature is between a room temperature and 350° C., and the second preset temperature is between the room temperature and 350° C.

Therefore, in a case that the heating part 2 includes the first heating unit 92 and the second heating unit 91 that are distributed alternately, the temperature of the coated regions 71 and the uncoated regions 72 can be flexibly controlled. That is, the two can have different temperatures after being heated, so that the extensibility parameters of the two can be adjusted flexibly to reduce the difference in the extensibility parameter between the two.

In another specific embodiment, the heating part 2 is an integrated structure. That is, the heating part 2 can simultaneously heat the uncoated regions 72 and the coated regions 71 when being passed through by the electrode plate 7. Similarly, the cooling part 3 may be an integrated structure, and the cooling part 3 can simultaneously cool the uncoated regions 72 and the coated regions 71 when being passed through by the electrode plate 7.

In this embodiment, the heating part 2 heats the uncoated regions 72 and coated regions 71, which are passed through by the heating part, to the same temperature. Therefore, the elastic modulus of both is reduced, and the extensibility of both is increased. However, due to different material properties between the uncoated regions 72 and the coated regions 71, when the two have the same relatively high temperature, the decrease of the elastic modulus of the uncoated regions 72 is smaller, and therefore, the increase of the extensibility parameter of the uncoated regions is smaller, thereby reducing the difference in the extensibility parameter between the uncoated regions 72 and the coated regions 71.

In the embodiments above, several idlers are disposed between the heating part 2 and the roller group 1, and the electrode plate 7 is wound on the idlers so that the electrode plate 7 is in a position that adapts to the heating part 2.

In the embodiment shown in FIG. 1, a first idler 4 and a second idler 5 are disposed between the heating part 2 and the roller group 1. After passing through the second idler 5, the electrode plate 7 passes through the heating part 5 in a quasi-horizontal direction, making the arrangement of the heating part 5 more convenient. Therefore, by disposing the idlers, the movement direction and the position of the electrode plate 7 can be adjusted.

In addition, the idlers may be disposed at an inlet and an outlet of the heating part 2 and at an inlet and an outlet of the cooling part 3 to adjust the movement direction of the substrate, so that the substrate can adapt to the heating part 2 and the cooling part 3 to implement heating and cooling.

On the other hand, in the above embodiments, the second extension assembly 8 (shown in FIG. 1) may include several extension rollers disposed downstream of the cooling part 3. Each extension roller can apply a pulling force to the upstream electrode plate 7 to extend the uncoated regions 72 and the coated regions 71 between the heating part 2 and the cooling part 3. In addition, the second extension assembly 8 may further include a tension monitoring part configured to monitor a tensile force of the electrode plate 7 upstream of the second extension assembly 8.

The electrode plate rolling apparatus further includes a control part configured to control turn-on, turn-off, and running speed of each part. For example, the control part can control rotation speeds of the upper roll roller 11 and the lower roll roller 12, the rotation speed of each idler, a preset heating temperature of the first heating unit 92 and the second heating unit 91 in the heating part 2, and a preset cooling temperature of the first cooling unit 102 and the second cooling unit 101 in the cooling part 3. In addition, the control part can control the rotation speed of the extension roller according to a monitoring result of the tension monitoring part.

When determining that the tensile force of the electrode plate 7 detected by the tension monitoring part is small, the control part controls the rotation speed of the extension roller to increase, so as to increase the tensile force of the electrode plate 7 and increase the pulling force applied to the electrode plate 7. When determining that the tensile force of the electrode plate 7 detected by the tension monitoring part is too great, the control part controls the rotation speed of the extension roller to decrease, so as to decrease the tensile force of the electrode plate 7 and decrease the pulling force applied to the electrode plate 7.

In addition, in the embodiment shown in FIG. 1, a third idler 6 is disposed between the cooling part 3 and the second extension assembly 8.

In the above embodiments, the heating part 2 may be at least one of a magnetic induction heating part, a hot air heating part, a radiant heating part, an infrared heating part, or a microwave heating part so long as the heating part can heat the uncoated regions 72 to a preset temperature. In addition, the cooling part 3 may be at least one of an air cooling part, an air cooling chamber part, or a liquid cooling part so long as the cooling part can cool down the uncoated regions 72 to a preset temperature.

Therefore, in this application, the specific structures of the heating part and the cooling part are not limited.

An embodiment of this application discloses an electrode plate rolling method, including: passing an electrode plate through a roller group; passing the electrode plate through a heating part so that the electrode plate is heated; passing the electrode plate through a cooling part so that the electrode plate is cooled; and extending an uncoated region of the electrode plate using an extension assembly when the heating part heats the electrode plate.

Exemplarily, the step of passing the electrode plate through a heating part so that the electrode plate is heated includes: passing the electrode plate through multiple first heating units and second heating units so that the electrode plate is heated, where the first heating units alternate with the second heating units along a width direction of the electrode plate; and each first heating unit is configured to directly heat a corresponding uncoated region, and each second heating unit is configured to heat a corresponding coated region.

Exemplarily, the step of passing the electrode plate through a cooling part so that the electrode plate is cooled includes: passing the electrode plate through multiple first cooling units and second cooling units so that the electrode plate is cooled, where the first cooling units alternate with the second cooling units along the width direction of the electrode plate; and each first cooling unit is configured to directly cool a corresponding uncoated region, and each second cooling unit is configured to cool a corresponding coated region.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application shall fall within the protection scope of this application.

What is claimed is:

1. An electrode plate rolling method, comprising:
passing an electrode plate through a roller group, the electrode plate comprising a plurality of coated regions alternating with a plurality of uncoated regions in a width direction of the electrode plate;
passing the electrode plate through a heating part so that the electrode plate is heated;
passing the electrode plate through a cooling part so that the electrode plate is cooled; and
extending an uncoated region of the electrode plate using an extension assembly when the heating part heats the electrode plate,
wherein the extending the uncoated region of the electrode plate using the extension assembly when the heating part heats the electrode plate comprises:
extending a size of the uncoated region of the electrode plate by deformation to a preset size under a pulling force of the extension assembly when the heating part heats the electrode plate.

2. The electrode plate rolling method according to claim 1, wherein the passing the electrode plate through the heating part so that the electrode plate is heated comprises:
passing the electrode plate through multiple first heaters and second heaters so that the electrode plate is heated, wherein the first heaters alternate with the second heaters along a width direction of the electrode plate; and each of the first heaters directly heats a corresponding uncoated region, and each of the second heaters heats a corresponding coated region.

3. The electrode plate rolling method according to claim 1, wherein the passing the electrode plate through the cooling part so that the electrode plate is cooled comprises:
passing the electrode plate through multiple first coolers and second coolers so that the electrode plate is cooled;
wherein the first coolers alternate with the second coolers along a width direction of the electrode plate; and each of the first coolers directly cools a corresponding uncoated region, and each of the second coolers cools a corresponding coated region.

4. The electrode plate rolling method according to claim 2, wherein the heating part and the cooling part are configured to reduce a difference between an extensibility parameter of the uncoated region and an extensibility parameter of the coated region.

5. The electrode plate rolling method according to claim 2, further comprising extending the uncoated region and the coated region disposed between the heating part and the cooling part using a second extension assembly including a plurality of extension rollers disposed downstream of the cooling part.

6. The electrode plate rolling method according to claim 5, further comprising:
monitoring a tensile force of the electrode plate using a tension monitoring part; and
controlling a rotation speed of at least one of the extension rollers according to a monitoring result of the tension monitoring part.

7. The electrode plate rolling method according to claim 1, wherein the heating part snugly adjoins the cooling part in an electrode plate rolling apparatus.

8. The electrode plate rolling method according to claim 2, wherein the each of the first heaters heats the uncoated region to a first preset temperature, and the each of the second heaters heats the coated region to a second preset temperature;
the first preset temperature is higher than the second preset temperature; and
the first preset temperature is between a room temperature and 350° C., and the second preset temperature is between the room temperature and 350° C.

9. The electrode plate rolling method according to claim 1, wherein the heating part is an integrated structure, and the cooling part is an integrated structure.

10. The electrode plate rolling method according to claim 1, wherein the heating part comprises at least one of a magnetic induction heating part, a hot air heating part, a radiant heating part, an infrared heating part, or a microwave heating part.

11. The electrode plate rolling method according to claim 1, wherein the cooling part comprises at least one of an air cooling part, an air cooling chamber part, or a liquid cooling part.

12. The electrode plate rolling method according to claim 1, further comprising:
winding the electrode plate on an idler between the heating part and the roller group so that the electrode plate is in a position that adapts to the heating part.

13. The electrode plate rolling method according to claim 1, wherein the uncoated region includes a plastic layer plated with a metal layer.

14. The electrode plate rolling method according to claim 1, wherein the electrode plate comprises coated regions alternating with uncoated regions in a width direction of the electrode plate.

15. The electrode plate rolling method according to claim 14, wherein a thickness of each of the coated regions is greater than a thickness of each of the uncoated regions.

* * * * *